May 3, 1932.    W. J. SPENGLER    1,856,975
SHAFT COUPLING
Filed Oct. 4, 1930    2 Sheets-Sheet 2
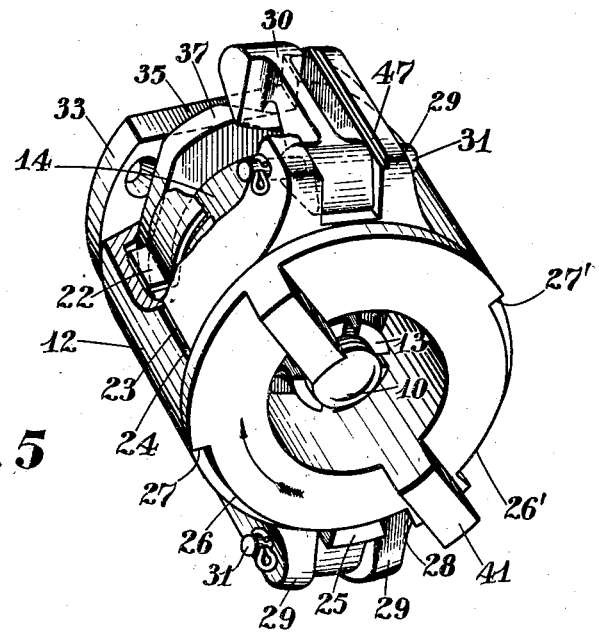
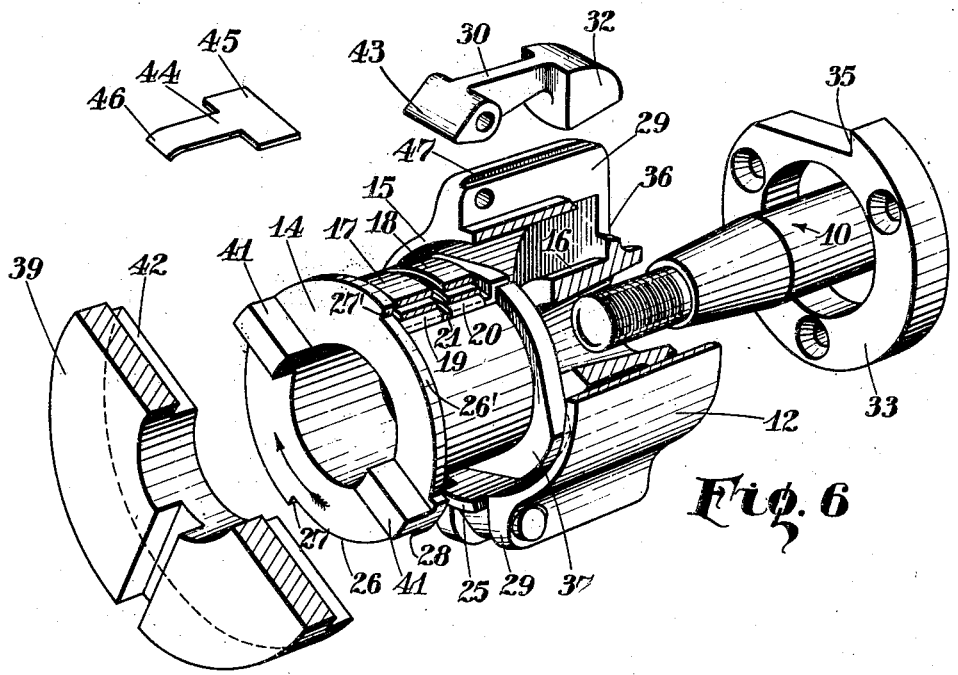
INVENTOR
W. J. Spengler
BY Clinton S. Janes
ATTORNEY Patented May 3, 1932

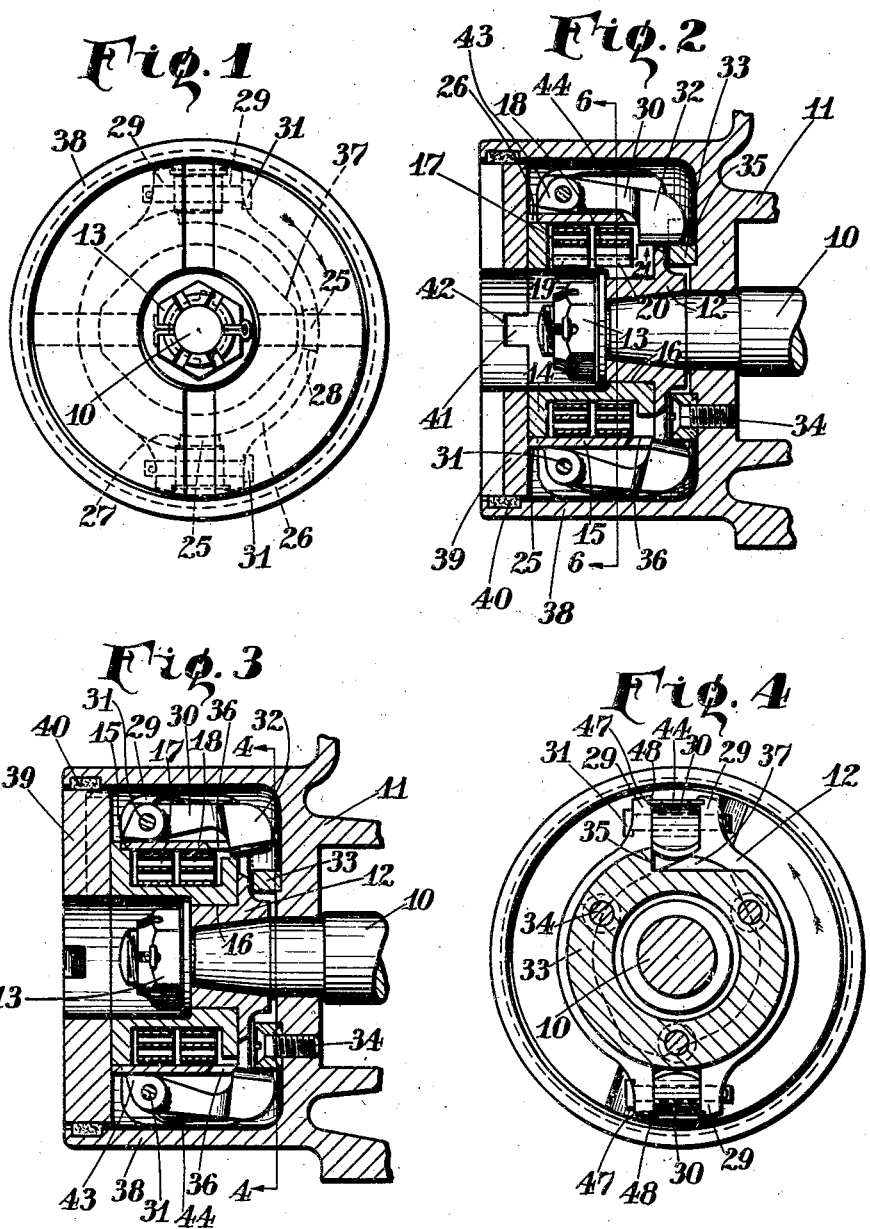

1,856,975

UNITED STATES PATENT OFFICE

WALTER J. SPENGLER, OF SIDNEY, NEW YORK, ASSIGNOR TO SCINTILLA MAGNETO COMPANY, INC., OF SIDNEY, NEW YORK, A CORPORATION OF NEW YORK

SHAFT COUPLING

Application filed October 4, 1930. Serial No. 486,344.

This invention relates to shaft couplings and more particularly to a novel form of impulse coupling for magneto generators.

Ignition magnetos, which are driven from an engine shaft and are designed to operate satisfactorily at the normal running speeds of the engine, can in general not be relied on to produce satisfactory ignition voltages at slow engine speeds such as during cranking of the engine in starting. In order to obviate this difficulty without resorting to an auxiliary ignition device for starting purposes, so called impulse couplings have been designed for driving the magneto, which operate as solid couplings at normal running speeds, but which at slow speeds are adapted to drive the magneto intermittently, imparting rapid rotational impulses thereto during the ignition periods of said engine.

One object of the present invention is to provide a novel coupling of this type which is smaller, lighter, and generally more efficient than devices of this character heretofore known.

Another object is the provision of such a coupling which is entirely reliable and automatic in its action over long periods of use.

A further object is to provide such a device which is composed of few parts, all of which are of comparatively simple design and which may be economically constructed and readily assembled.

Further objects and advantages will be apparent to those skilled in this art from the following description, taken in connection with the accompanying drawings in which:

Fig. 1 is an end view of the device;

Fig. 2 is a longitudinal mid-sectional view;

Fig. 3 is a view similar to Fig. 2 showing the coupling elements in a different cooperative relationship;

Fig. 4 is a transverse section taken substantially on the line 4—4 of Fig. 3;

Fig. 5 is a perspective view of the coupling, partly broken away, with the parts in the positions illustrated in Figs. 3 and 4; and Fig. 6 is an expanded perspective view of the coupling, partly in longitudinal section.

In the embodiment of the invention herein illustrated, a driven shaft 10 which may be the shaft of a magneto generator, journaled in any suitable way in the end of the magneto frame 11, is adapted to be rotated from a suitable rotating part of an engine, not shown.

For this purpose a driven coupling member 12 is keyed in any suitable way upon the shaft 10 and retained thereon as by means of a castellated nut 13 threaded on the end of said shaft. The driven coupling member 12 is formed as a hollow shell as best illustrated in Fig. 6 of the drawing and a driving coupling member 14 is nested therein and adapted to have a running fit within the peripheral portion 15 and upon the hub portion 16 of said driven member.

The driving and driven members 14 and 12 are connected for normal rotation in unison by yielding coupling means herein illustrated as a pair of volute springs 17 and 18 having inturned ends 19 and 20 respectively adapted to engage in a slot 21 of the driving member, and having outwardly extending ends 22 and 23 (Fig. 5) adapted to engage in a radial slot 24 in the driven member. Relative rotation between the driving and driven members is positively limited by means such as the longitudinally extending lug 25 on the driven member which engages in the arcuate cut-out portion 26 of said driving member. The coupling springs 17 and 18 are assembled under sufficient tension to normally retain the lug 25 against the shoulder 27 which defines that end of the cut-out portion 26 of the driving member which is advanced in the direction of rotation of the parts. Obstruction of the rotation of the driven member 12 while the driving member is rotating will cause a winding up of the springs 17 and 18 which is limited by the engagement of the lug 25 by the shoulder 28 which defines the rearward end of the cut-out portion 26.

Driven coupling member 12 is provided exteriorly thereof with one or more pairs of radially extending ears 29, and a corresponding number of pawls or latch members 30 are adapted to be pivoted therebetween as by means of transverse pins 31. The free ends or noses of said pawls are enlarged and formed with flat sides as indicated at 32 to slide freely between and be guided by the interior surfaces of said ears 29. A detent member, here shown in the form of a ring 33 fixedly mounted as by means of screws 34 on the magneto frame 11, is provided with a notch 35 adapted to engage the nose 32 of either of said pawls 30 when it is moved inwardly by the force of gravity, and thus temporarily lock the driven member from rotation. The driven member is provided with openings 36 formed to allow said nose 32 of the pawl to extend within said driven member as indicated in Fig. 2 when said pawl is in engagement with the notch 35 of said detent member 33.

The driving member 14 is provided at its inner end with radially extending cams 37 which are arranged in the transverse plane of the inwardly extending noses 32 of said pawls, but are normally angularly spaced therefrom so as to allow the pawls to move inwardly and engage the notch 35 of the detent member. When the driving member has advanced through a predetermined angle with respect to the driven member, which is substantially less than the angular extent of the cut-out portion 26, the cam members 37 will be rotated sufficiently to engage and raise the pawl 30 from its engagement with the detent 33 and thus permit the springs 17, 18 to unwind and rotate the driven member rapidly to its normal position relative to the driving member, as defined by the engagement of lug 25 with shoulder 27.

The frame 11 is preferably extended in the form of a cylindrical housing 38 adapted to enclose the coupling members, and a universal coupling member here shown in the form of an Oldham coupling member 39 is arranged to have a loose running fit within said housing. Suitable packing 40 may be introduced in the outer end of the housing 38 in order to form a substantially lubricant and dust tight connection between the coupling members 39 and said housing.

The driving coupling member 14 is provided with longitudinally extending radial tongues 41 adapted to engage with the grooves 42 in coupling member 39 in the usual manner, and it will be understood that the coupling member 39 will be suitably driven from a rotating part of the engine, and in a definitely timed relation thereto.

The pawls 30 are preferably provided with projections 43 adapted to engage the periphery of the driven member 12 to prevent said pawls from being thrown outwardly into engagement with the housing 38 under the action of centrifugal force.

It has been found desirable in some instances to provide means for yieldingly urging the pawls 30 inwardly in order to overcome friction of the pawls in their slots and to provide a more definite control of the pawls with relation to the speed of the coupling. When this yielding means is arranged to be adjustable, it further provides a simple and effective method of regulating the speed at which the coupling member becomes a solid drive, and enables a standard coupling unit to be adapted to various types of installation having different cranking speeds.

A preferred embodiment of such a means is illustrated in the form of flat compensating springs 44 having one end 45 (Fig. 6) rigidly secured in the driven coupling member 12, and the other end 46 bearing upon the pawls 30 at a point slightly outward from the pivots 31 of said pawls. The mounting for the springs 44, in coupling member 12, may, as here illustrated, take the form of grooves 47 in the inner edges of ears 29, adapted to receive the ends 45 of said springs, the springs being retained therein by peening over the tops of the ears 29 as indicated at 48 (Fig. 4).

It will be understood that the pressure of the springs 44 on the pawls 30 may be readily adjusted to secure the desired operating characteristics of the coupling.

The coupling as herein illustrated is designed for rotation in the direction of the arrows in Figs. 1, 4, 5, and 6. In case it is desired to rotate a magneto of the opposite hand, it is merely necessary to assemble the springs 17, 18 reversely, with the lug 25 of the driven member against the shoulder 27' of the cut-out portion 26' in the driving member, and to use a detent member 33 with a notch facing in the reverse direction. If desired, the detent member may be countersunk on both sides so that it may also be reversible, in which case the entire device may be assembled for either right or left hand drive as desired.

In operation, when the coupling member 39 is rotated slowly as during the cranking of the engine, driving member 14, being keyed thereto as indicated at 41, 42, is positively rotated therewith. The driven member 12 is rotated with the driving member 14 by the springs 17, 18 until the nose of one of the pawls 30 falls into the notch 35 of the detent member 33 as indicated in Fig. 2. The driven member is thus prevented from rotation and the driving member is caused to advance, winding up said springs until a cam member 37 engages said pawl 30 and lifts it from its locking position as shown in Figs. 3, 4, and 5. The springs thereupon rapidly unwind and impart a relatively high rotary speed to the driven member 12 and magneto shaft 10 until they are again brought into their normal timed relation with the driving member 14.

It will be understood that the coupling is so timed with relation to the engine that this rapid rotation of the magneto shaft takes place at the instant when an explosive charge in said engine is to be ignited, and the current generated thereby is used for that purpose.

As soon as the engine starts, the steady rotation of the coupling is sufficiently rapid to generate adequate ignition voltages. The pawls 30 are then maintained in their outer positions by centrifugal force so that the coupling functions as a solid or rigid coupling.

Referring more in detail to the action of the pawls 30, it will be noted that said pawls, by virtue of their design as weighted levers, and irrespective of the action of springs 44, will, when the coupling is rotated slowly, enter the notch 35 in detent member 33 and remain there until released by the cam 37 at the time of impulse operation. As the coupling increases in speed, centrifugal force counteracts the force of gravity upon the pawls and prevents them from falling into the notch 35. When the speed of the coupling diminishes, the pawls seek to fall by gravity into the notch 35, but if the springs 44 are omitted a certain amount of friction caused by dust, rust, etc., forming on each side of the pawl, may prevent the pawl from fully seating itself. A film of oil or dirt beneath the bottom surface of the pawl would also cause a sticking action and would further retard its motion. The compensating springs 44, bearing upon the top surfaces of the pawls, are designed to overcome this friction and insure the engagement of the pawls at the proper time. This quick seating action is quite desirable in that it prevents the pawls from jumping over the notch 35.

The compensating springs also provide a simple and effective means for regulating the throwing out speed of the pawls. This feature permits the use of a standard coupling for all types of conventional engine installations. Thus for a four cylinder engine installation in which the magneto is driven at engine speed, assuming a cranking speed of the engine, of about 100 R. P. M., the desired throw-out speed would be approximately 120 R. P. M., while for a six cylinder engine in which the magneto is driven at one-and-a-half times engine speed, the throw-out speed would be approximately 180 R. P. M. It is necessary therefore with the usual impulse coupling to change the design for each particular type of installation, whereas the compensating spring arrangement permits using a standard coupling for all types, the only change necessary being in the amount of spring pressure applied to the pawls.

It will be seen that there is here provided an impulse coupling which is small and light, due to the hollow form and nested relation of the parts, but which is so designed as to be strong and reliable in operation while comparatively simple and economical to construct.

Although but one form of this invention has been shown and described in detail it will be understood that other embodiments are possible and certain modifications and rearrangements of the parts will suggest themselves to those skilled in this art.

Reference to the claims appended hereto will therefore be had for a definition of the scope of the invention.

What is claimed is:—

1. In a device of the class described, a hollow driven member, a driving member journaled therein, yielding driving means connecting said members, means for positively limiting relative angular movement between said members, a fixed detent member, a weighted pawl pivoted on said driven member to swing radially, and adapted when moved inwardly to engage said detent, said driven member having an opening through which the nose of said pawl projects when the pawl is moved inwardly, said driving member having a cam adapted to engage and move the nose of said pawl outwardly to release the same from said detent after a predetermined angular movement of the driving member in advance of said driven member.

2. In a device of the class described, a hollow driven member, a driving member journaled therein, means for positively limiting relative angular movement between said members in both directions, yielding driving means connecting said members and normally maintaining the driven member at a maximum angular advance with respect to the driving member, a fixed detent member, a weighted pawl pivoted to swing radially on the exterior of said driven member and adapted when moved inwardly to engage said detent, said driven member having an opening through which the nose of said pawl projects when the pawl is moved inwardly, said driving member having a cam adapted to engage and move the nose of said pawl outwardly to release the same from said detent after a predetermined angular movement of the driving member in advance of said driven member, a stationary housing, surrounding said coupling members, and a universal coupling member arranged to rotate the driving member and to cooperate with the housing to form a lubricant-tight casing for the coupling.

3. In a device of the class described, a hollow driven member, a driving member journaled therein, means for positively limiting relative angular movement between said members in both directions, yielding driving means connecting said members and normally maintaining the driven member at a maximum angular advance with respect to the driving member, said driven member having a pair of radially extending ears, a pawl pivoted to swing between said ears and having a weighted extremity slidably guided thereby, a stationary housing surrounding said coupling members, a detent fixed to said housing and adapted to engage said pawl when the latter moves inwardly, said driving member being formed with a cam projection, said driven member having a radial opening through which the pawl is adapted to project and cooperate with said cam whereby said cam operates to raise the pawl out of said detent after a predetermined angular advance of the driving member with respect to the driven member.

4. In a device of the class described, a stationary housing, a driven shaft journaled therein, a universal coupling member adapted to form a closure for said housing, driving and driven coupling members in nested relation within said housing and keyed respectively to said universal member and said driven shaft, means connecting said driving and driven members for normal rotation in unison, but adapted to yield when rotation of the driven member is prevented, a detent fixedly mounted on the interior of the housing, a weighted pawl mounted on the driven member and adapted upon slow rotation of the driven member to engage the detent and arrest said rotation, but arranged to clear said detent when rotated rapidly, means on the driving member to lift said pawl from said detent after a predetermined angular advance of the driving member, and means on said pawl cooperating with said driven member to prevent said pawl from being thrown against said housing.

5. An impulse coupling for magneto generators including a cylindrical housing rigid with the frame of the generator and adapted to surround the generator shaft coaxially therewith, a hollow driven coupling member fixed on said generator shaft within said housing, a driving coupling member journaled within said driven member, volute springs yieldingly connecting said coupling members, said springs being wound under initial tension greater than the normal driving load, said coupling members having engaging shoulders limiting the unwinding of the springs, a pawl pivoted on the driven coupling member to swing radially in response to gravity or to centrifugal force, a detent member fixed to said housing, and having a notch adapted to engage and hold the extremity of said pawl when the pawl is swung inwardly by gravity, whereby the driven member is prevented from rotation, said driving member having a cam adapted to cooperate with the extremity of said pawl after a predetermined angular movement of the driving member ahead of the driven member whereby the pawl is raised from said detent and the springs are allowed to rapidly bring the driven member into synchronism with the driving member.

6. An impulse coupling including a hollow cylindrical driven member, a driving member journaled therein, yielding means connecting said members for normal rotation in unison, means on the exterior of the driven member for locking the driven member from rotation, said driven member having radial openings adjacent said locking means, and means on the driving member cooperating with the locking means through said openings to render the locking means inoperative after a predetermined relative rotation of the driving and driven members.

7. An impulse coupling including a hollow cylindrical driven member, a driving member journaled therein, yielding means connecting said members for normal rotation in unison, means on the exterior of the driven member for locking the driven member from rotation, said driven member having radial openings adjacent said locking means, and means on the driving member normally spaced angularly from said locking means, adapted to cooperate with and move the locking means through said openings to inoperative position after a predetermined angular movement of the driving member in advance of the driven member.

8. An impulse coupling including a hollow cylindrical driven member having a hub extending into the interior thereof, a driving member journaled within the driven member, enclosed thereby, and bearing on said hub, yielding means connecting said members for normal rotation in unison, a fixed detent member, locking means for the driven member on the exterior thereof adapted to cooperate with said detent member, said driven member having openings through which the locking means project when in locking position, and means on the driving member adapted to engage the inwardly projecting parts of the locking means and move them from locking position after a predetermined angular advance of the driving member with respect to the driven member.

9. An impulse coupling including a hollow driven member, a driving member journaled therein, yielding driving means connecting said members, a fixed detent member, a weighted pawl mounted eccentrically on said driven member movable radially inward to engage said detent and maintained out of such engagement by centrifugal force during rapid rotation of the driven member, means yieldably urging said pawl into engagement with said detent, said means being adjustable to regulate the speed at which the pawl will be held out of engagement by centrifugal force, and means on the driving member adapted to positively move said pawl out of engagement with said detent after a predetermined lag of the driven member with respect to the driving member.

10. An impulse coupling including a hollow cylindrical driven member, a driving member journaled therein, yielding means connecting said members for normal rotation in unison, means on the exterior of the driven member for locking the driven member from rotation, said driven member having radial openings adjacent said locking means, and means on the driving member cooperating with the locking means through said openings to render the locking means inoperative after a predetermined relative rotation of the driving and driven members, said yielding means and said locking means being formed to allow reversed assembly thereof whereby the coupling may be assembled for rotation in either direction.

In testimony whereof I have signed this specification.

WALTER J. SPENGLER.